W. SIMONSSON.
INDICATING AND REGISTERING MECHANISM.
APPLICATION FILED DEC. 28, 1908.
1,137,094.
Patented Apr. 27, 1915.
5 SHEETS—SHEET 1.
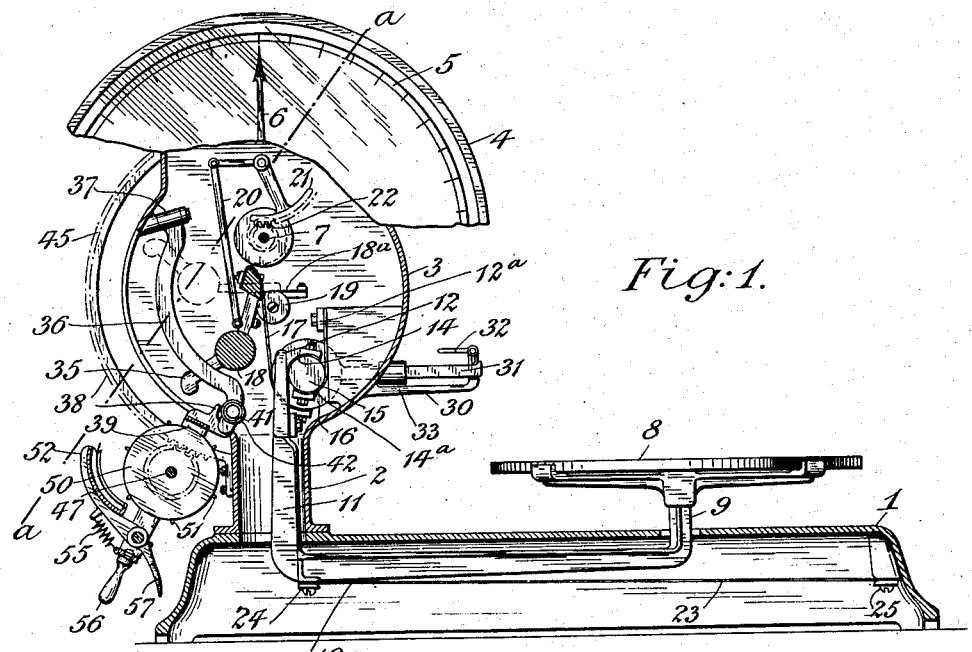
Fig. 1.
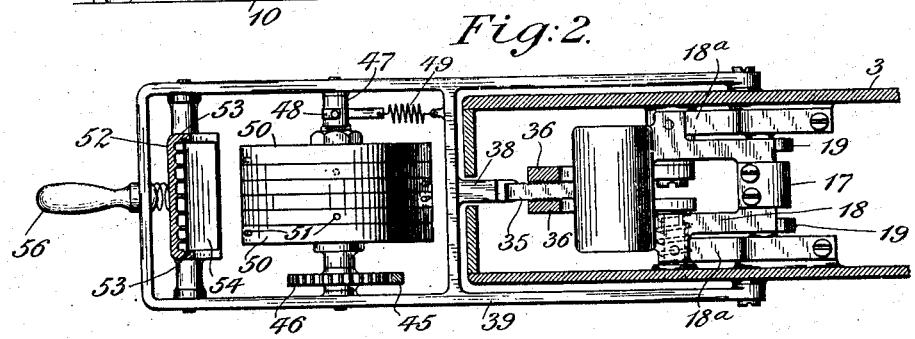
Fig. 2.
Fig. 5.
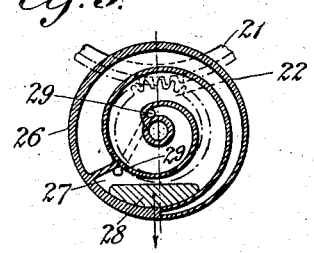
Fig. 6.
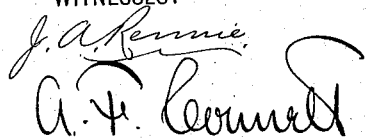
WITNESSES:
INVENTOR
Wilhelm Simonsson
BY
ATTORNEY

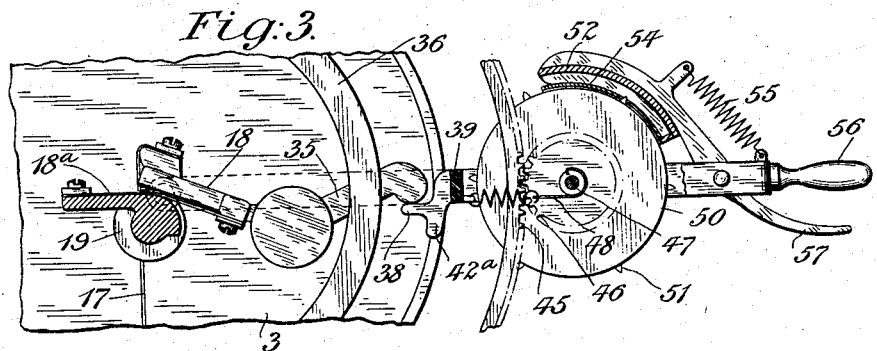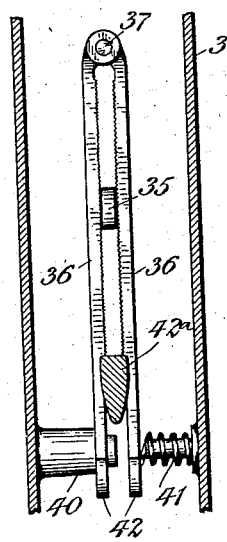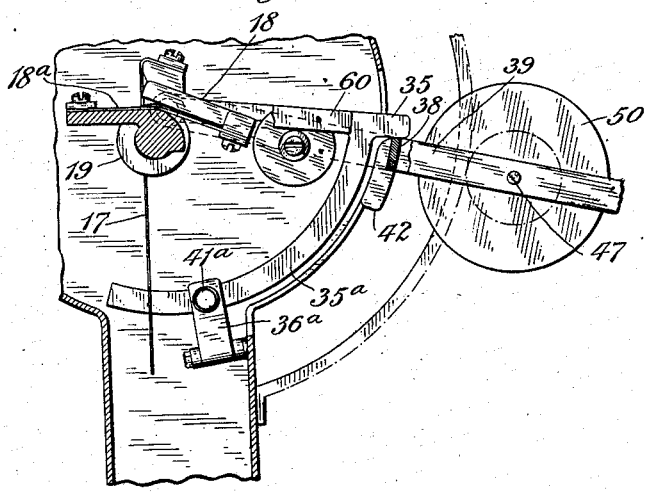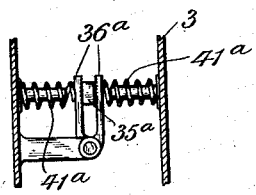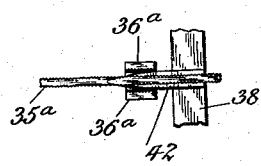

W. SIMONSSON.
INDICATING AND REGISTERING MECHANISM.
APPLICATION FILED DEC. 28, 1908.
1,137,094.
Patented Apr. 27, 1915.
5 SHEETS—SHEET 3.
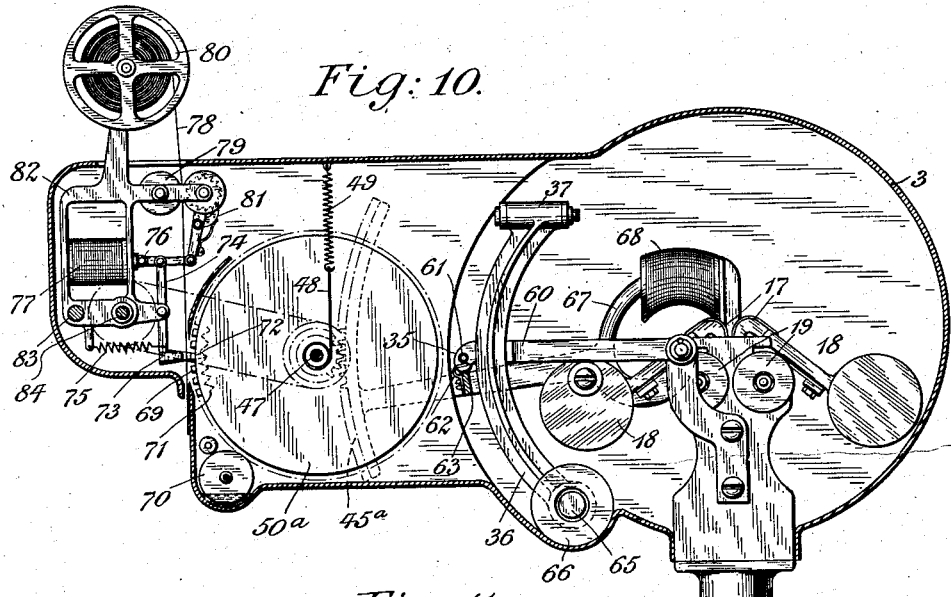
Fig: 10.
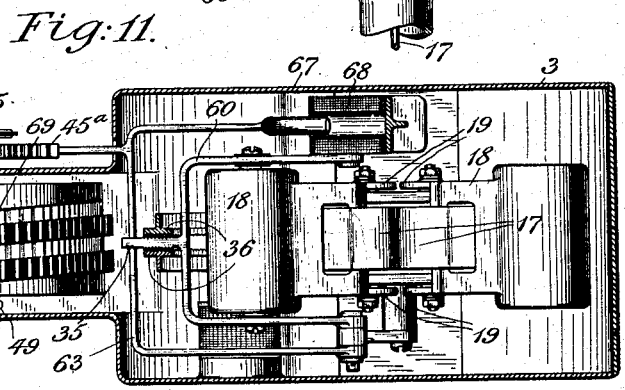
Fig: 11.
Fig: 12.    Fig: 13.
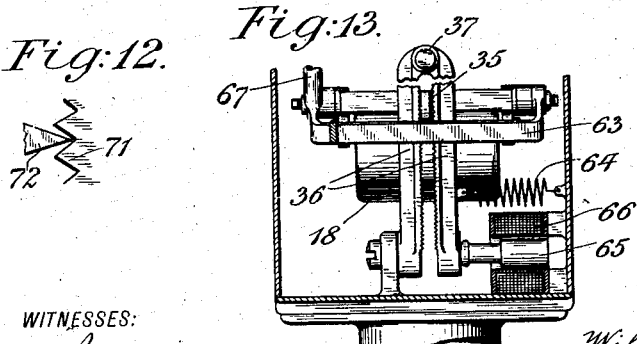
WITNESSES:
J. A. Rennie
A. F. Connell
INVENTOR
Wilhelm Simonsson
BY
ATTORNEY

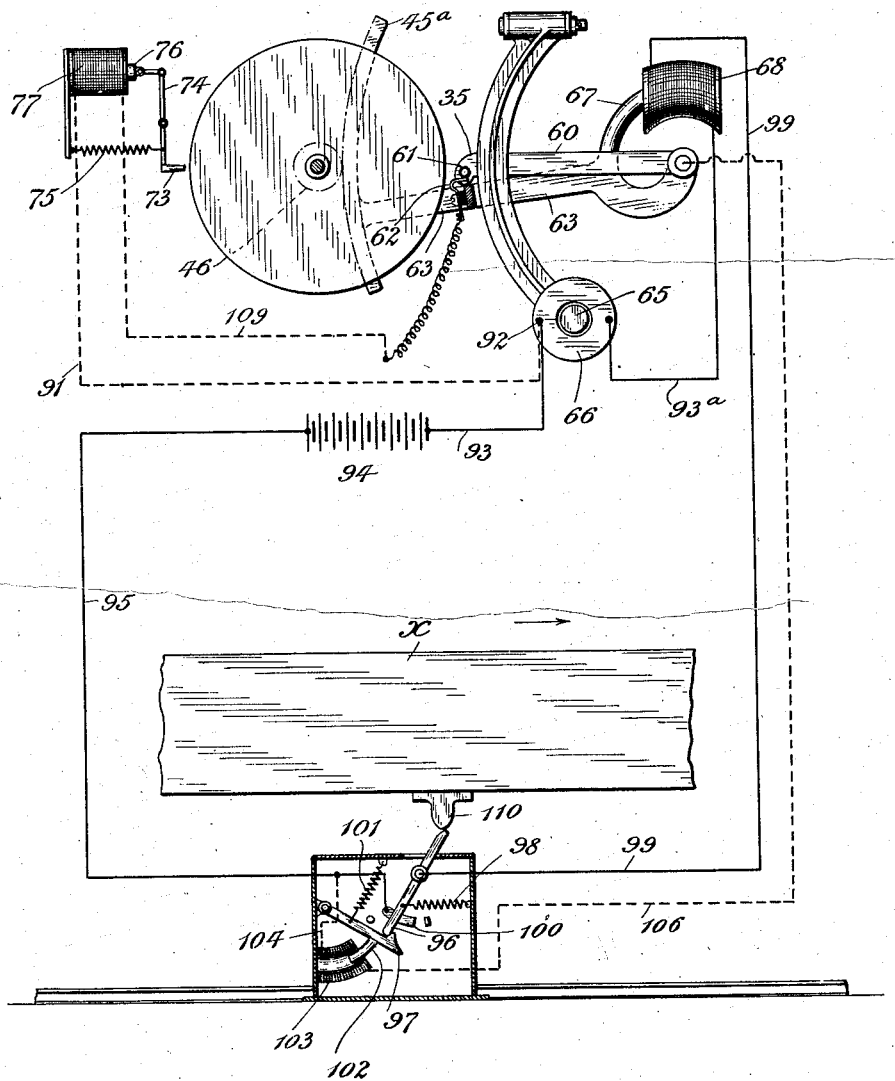

W. SIMONSSON.
INDICATING AND REGISTERING MECHANISM.
APPLICATION FILED DEC. 28, 1908.
1,137,094.
Patented Apr. 27, 1915.
5 SHEETS—SHEET 5.
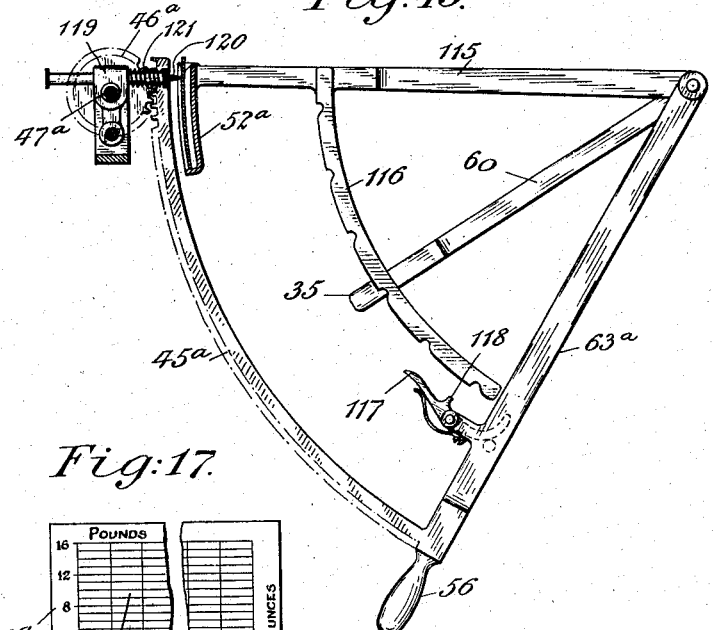
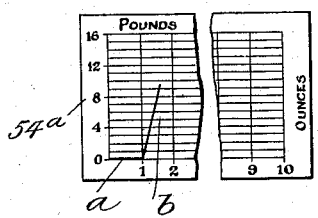
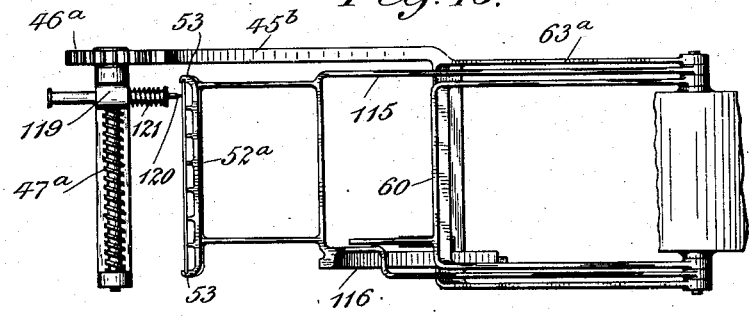
WITNESSES:
J. A. Rennie
A. P. Comwell
INVENTOR
Wilhelm Simonsson
BY
ATTORNEY

UNITED STATES PATENT OFFICE.

WILHELM SIMONSSON, OF NEW YORK, N. Y.

INDICATING AND REGISTERING MECHANISM.

1,137,094.  Specification of Letters Patent.  Patented Apr. 27, 1915.

Application filed December 28, 1908. Serial No. 469,625.

*To all whom it may concern:*

Be it known that I, WILHELM SIMONSSON, a subject of the King of Sweden, and a resident of the city, county, and State of New York, have invented certain Improvements in Indicating and Registering Mechanism, of which the following is a specification.

This invention relates to certain improvements in indicating and registering mechanisms, such as are particularly designed and adapted for employment in connection with measuring instruments of various types, such for example, as weighing scales, cash registers, and the like, and the object of the invention is, in part, to provide an index mechanism capable of general employment in connection with such measuring instruments and having means of a novel and improved character for retarding vibration or oscillation of the movable index member and capable of operation without materially detracting from the accuracy of indication of the instrument; and in part, to provide for use in connection with measuring instruments generally, a novel and improved construction and arrangement of registering mechanism capable of convenient and effective operation to register the movement of the instrument in connection wherewith the improved mechanism is applied for use, without imposing any material or harmful stress upon the operative parts thereof.

The invention consists, in part, in an index mechanism having members one of which is mounted for turning movement relatively to the other, and a counterbalancing device eccentrically arranged with relation to such movable index member and capable of operation to retard vibratory or oscillatory movement thereof.

The invention also consists, in part, in a registering mechanism for employment in connection with a measuring instrument of any preferred character, and capable of movement independently thereof in order to permit of being adjusted into registering position, and means, actuated in unison with such measuring instrument in connection with which the mechanism is employed, and capable of operation to terminate the adjusting movement of said registering mechanism.

The invention also consists in a registering mechanism of the character defined above, wherein the means for terminating the adjusting movement of the registering mechanism comprises a part which is adapted for movement in unison with the operation of the instrument in connection wherewith the mechanism is used, and wherein means are provided for holding said part in position when moved, whereby the strains which would otherwise be imposed upon the operative parts of the measuring instrument are effectively overcome and damage thereto is avoided.

The invention also contemplates certain novel features of construction, and combinations and arrangements of the several parts of the said improved index mechanism and registering mechanism, whereby certain important advantages are attained, and said mechanisms are rendered simpler, less expensive, and otherwise better adapted and more convenient for use, all as will be hereinafter fully set forth.

The novel features of the invention will be carefully defined in the claims.

In order that my present improvements may be the better understood I have illustrated herein several embodiments of the invention, one of which I have shown as applied for use in connection with a weighing scale, in which drawings—

Figure 1 is a sectional elevation taken vertically through a weighing scale showing my improvements applied thereto for use; Fig. 2 is an enlarged fragmentary sectional view taken in the plane indicated by the line $a$—$a$ in Fig. 1, and showing certain features of the registering mechanism which will be hereinafter explained; Fig. 3 is an enlarged fragmentary detail view showing, in sectional side elevation, certain of the parts illustrated in Fig. 2; Fig. 4 is an enlarged fragmentary detail view showing certain features of the detent means illustrated in Fig. 1 for holding the weighing mechanism from movement during actuation of the registering mechanism; Fig. 5 is an enlarged sectional detail view showing certain features of the improved index mechanism which will be hereinafter explained; Fig. 6 is a fragmentary view showing a printed record form capable of employment in connection with the improved registering mechanism; Fig. 7 is a view somewhat similar to Fig. 3, and illustrating a modified formation of the parts therein shown; Fig. 8 is a fragmentary detail view showing certain features of the detent means illustrated in Fig. 7 for holding the measuring instrument from movement during actuation of the registering mechanism; Fig. 9 is a further fragmentary detail view showing other features of such detent mechanism illustrated in Figs. 7 and 8; Fig. 10 is a view somewhat similar to Figs. 3 and 7 but illustrating a third formation of the improved registering mechanism wherein the same is electrically controlled; Fig. 11 is a sectional plan view of the parts shown in Fig. 10; Fig. 12 is an enlarged fragmentary detail view showing a feature of construction to be hereinafter referred to; Fig. 13 is a vertical section taken horizontally through the device constructed as shown in Figs. 10 and 11; Fig. 14 is a diagraphic view showing certain of the circuit connections and included devices of the structure illustrated in Figs. 10, 11 and 13; Fig. 15 is a fragmentary side elevation showing yet another modified formation of the improved registering mechanism; Fig. 16 is a plan view of the structure shown in Fig. 15, and Fig. 17 is a view somewhat similar to Fig. 6, but illustrating a modified form of printed chart or record for use in connection with the mechanism illustrated in Figs. 15 and 16.

I will first describe my invention with reference to Figs. 1 to 6 of the accompanying drawings, wherein I have illustrated my improvements applied for use in connection with a weighing scale, but I desire it to be understood that the present invention, although capable of very advantageous application for use in connection with measuring instruments of this general class, is not limited thereto, but is capable of employment with good results in connection with measuring instruments of many other kinds, as dynamometers, cash registers, testing instruments and the like, and as the weighing scale to which I have herein shown my improvements applied for use presents several features of material novelty and improvement, although the same are not claimed specifically herein, I will preface the description of my present invention with a description of such improved weighing scale. This weighing scale comprises a base 1 adapted to be rested upon a counter or other support, and having at one end a tubular upright or pillar 2, the upper part of which is provided with a circular enlargement chambered as shown at 3 to receive and house certain operative devices of the weighing mechanism, index means and registering mechanism, the index means comprising a dial member 4 of circular formation, provided with a curved or circular series of graduations 5, and an index member 6 herein shown as made in the form of a pointer carried upon a shaft 7 extended across the circular casing portion 3, and adapted to be actuated from the weighing mechanism within said member or portion 3 as will be hereinafter explained.

8 represents a pan or equivalent support for the article to be weighed, said pan or support being carried upon the upper end of an upwardly directed part 9 at one end of a bent lever or draft member, which comprises a horizontally extended part 10, extended within the base 1 and connected integrally with the part 9 at one end and having at its opposite end a similar but longer integral upturned or vertically directed part 11, which is extended up within the chamber of the upright or pillar 2 and has its upper end provided with forks or bifurcations 12, 12, which are spaced apart from each other and to which are connected the lower ends of flexible suspenders 14, 14, herein shown as made in the form of thin metal strips or tapes, the upper ends of which are passed around the curved perimetral surfaces of an actuating member 15, which is interposed between the lever or member 10 and the weighing mechanism and is provided with a circular projection 16 at its center the perimeter of which is extended for turning movement between the forks or bifurcations 12, 12 of the upright part 11 of the bent platform lever or member 10.

The curved parts of the actuating member 15 wherewith the suspenders 14, 14 have connection are arranged at opposite sides of the central circular projection 16 of said member, so as to afford rolling bearings upon which the forks or bifurcations 12, 12 of the bent lever or member are adapted to press, and 14$^a$, 14$^a$ represent other suspenders, reversely arranged with reference to the suspenders 14, 14, but otherwise similar thereto except that their lower ends have connection with the opposite sides of the actuating member 15 and are passed around the opposite curved surfaces thereof in an upward direction and that their upper ends have connection with vertical spaced surfaces 12$^a$, 12$^a$ produced upon a fulcrum block, which affords rolling fulcra adapted to be traversed by the opposite curved surfaces of the actuating member 15 when the same is turned in unison with the movements of the bent platform lever or member 10.

17 represents a flexible connector, also made in the form of a thin metal strip or tape as herein shown, its lower end being affixed to the lower part of the circular central projection 16 of the actuating member 15, and being passed thence upwardly around the perimeter of said projection 16 and having its upper end extended within the circular casing portion 3 and connected with the upper end of a pendulating weighted lever, forming part of weighing mechanism similar to that described and claimed in my pending patent application, Serial No. 387,144, filed August 5, 1907. Said pendulating lever 18 has a curved surface adapted to be traversed by the tape or connector 17 when the same is drawn endwise, and is supported by means of flexible suspenders 18ª for contact against rolling fulcra 19, 19.

20 represents a link which affords a connection between the pendulating lever 18 and a pivotally mounted segment rack 21 the toothed surface of which intermeshes with a pinion 22 upon the index shaft 7 in such a manner as to impart turning or rocking movement thereto in unison with the movement of the pendulating lever 18, whereby the pointer 6 is caused to traverse the graduated dial member 4 in a well known way to indicate the weight of the article rested upon the pan or support 8.

In order to compel rectilinear or substantially rectilinear movement of the bent platform lever or member 10, and to prevent such pivotal movement thereof under the influence of the articles placed upon the pan or support 8, I provide flexible tapes or connectors 23, 23, extended along opposite sides of the horizontally extended part 10 of said lever or member, each such tape or connector 23 having one end connected as shown at 24 with said lever or member 10 at a point adjacent to the lower end of the upturned end 11 thereof, and being extended thence along the horizontally extended part 10 of the lever or member and having at its opposite end connection with the end of the base as clearly shown in Fig. 1. By this construction and arrangement of the parts, when an article to be weighed is rested upon the pan or support 8, the force exerted thereby upon the bent platform lever or member will be prevented from imparting to such member or lever such pivotal or swinging movement as would tend to cause the same to bind and thereby detract from the accuracy of indication, and the flexible tapes or connections 23, 23 will compel substantially rectilinear vertical movement of the upturned part 11 of said member or lever, whereby the forks or bifurcations 12, 12 thereof are caused to traverse the opposite curved surfaces of the actuating member 15, and to impart such turning or rocking movement thereto as will be communicated through the flexible connector 17 to rock the pendulating lever 18 and thereby afford accurate indication of the weight at the index means.

As shown in Fig. 1, the actuating member 15 is also provided with a horizontally directed arm or projection 31, which is capable of employment as a tare beam and carries a sliding poise 33, the position of which may be shifted to vary the operation of the pendulating lever 18 in a well known manner. The casing 3 has an arm 33 whereon is pivoted a detent 32 capable of operation to lock the tare beam 31 and thereby prevent movement of the actuating member 15 when the scale is now desired for use.

The improved index means as herein shown comprises a cylindrical casing or shell 26 which is affixed upon the index shaft 7 within the casing portion 3, and is provided with a volute channel or passage 27, the inner end of which is arranged adjacent to the circumference of said shaft 7, from which point said channel or passage 27 is extended in volute form to a point adjacent to the perimeter of the cylindrical shell or casing 26, as clearly shown in Fig. 5 of the drawings. The curvature of the volute channel or passage 27 has a uniform eccentricity with relation to the shaft 7 throughout its entire length.

A supply of mercury, as shown at 28, or an equivalent shiftable or rolling weight is inclosed within the channel or passage 27 and is adapted, as the shell or casing 26 turns in unison with the rotary movements of shaft 7, to roll along said volute channel or passage, and thereby exert sufficient leverage upon said shaft at all times to prevent looseness or chattering at the gear connection with the segment rack, and to effectively check and retard the vibratory or oscillatory movements which would otherwise be exhibited at the pointer 6 during the weighing operation. By reason of the uniformity of eccentricity of said passage or channel 27 with relation to said shaft 7, the leverage exerted by the weight or supply of mercury 28 upon the shaft is maintained substantially constant throughout the movement thereof, and interference with the accuracy of indication is avoided.

29 represents a reduced passage affording communication from the inner to the outer end of the eccentric or volute passage 27, so as to permit the flow of air therethrough in case said passage or channel 27 shall be occluded by the mercury, and when the mercury arrives at the termination of the outer part of the passage or channel 27, it is permitted to traverse said reduced passage 29 and flow back into the inner end of said passage or channel 27, and vice versa. It will be obvious that a rolling or shifting weight of any kind may be substituted for the mercury without departure from the invention.

As shown in the drawings, the pendulating lever 18 has an extension 35 directed outwardly from it and arranged to play during movement of said lever, between spaced detent members 36, 36, which are arranged within the casing portion 3 and are curved concentrically with relation to the rolling fulcra 19 of said lever 18, said detent members 36 being pivotally connected at their upper ends as shown at 37, so as to be capable of movement toward and from each other in and out of clamping engagement with said extension 35 of the pendulating lever. To permit effective clamping engagement of said members 36, 36 with said extension 35, the contacting surfaces of these parts may be roughened or serrated, as clearly shown in Fig. 4.

One of the detent members 36 has its lower end portion supported at 40 in the casing portion 3, and the other detent member 36 has its corresponding end portion engaged with a spring 41, which exerts its tension to force said member toward the other member 36 in such a manner as to effectively clamp and hold the interposed extension 35 of lever 18. The said lower ends of the members 36, 36 are also provided with outwardly directed parts 42, which are spaced from each other to receive a tapered wedging member 42$^a$, carried by a cross bar which forms part of a yoke or lever 39, pivotally supported upon the casing portion 3 adjacent to the rolling fulcra of the pendulating lever 18 and projecting from its point of connection with said casing portion in such position that when said yoke or lever 39 stands in a lowered position, as shown in Fig. 1, the wedging member 42$^a$ is engaged between the parts 42, 42 of the detent members 36, 36 in such a manner as to force the same apart against the tension of the spring 41, and release the extension 35 so as to permit free swinging movement of the pendulating lever 18 during the weighing operation.

The yoke or lever 39 affords a support whereon the improved registering mechanism embodying my invention is carried and said yoke or lever is provided at its outer end with a handle 56 by means of which it may be conveniently swung pivotally upon its connection with the casing portion 3 from its lowered inoperative position shown in Fig. 1, to such raised or elevated position as will correspond with the movement of the pendulating lever 18 during the weighing operation, in order that the weight of the article rested upon the pan or support 8 may be conveniently registered as will be hereinafter explained.

In order to limit the upward swinging movement of the said yoke or lever 39 when the same is moved during the weighing operation to actuate the registering mechanism carried upon it and thereby register the weight of the article rested upon the pan or platform 8, I have shown said yoke or lever 39 provided with an abutment or contact member 38 which is adapted, in the upward swinging movement of said yoke or lever 39, to come into contact with the extension 35 of the pendulating lever 18 and to operate to stop such swinging or pivotal movement of the yoke or member 39. By this construction and arrangement of the parts, the yoke or lever 39 being in its lowered inactive position shown in Fig. 1 at the commencement of the weighing operation, it will be seen that when the article to be weighed is placed upon the pan or support 8, the wedging member 42$^a$ of said yoke or lever 39 will operate by its engagement between the detent members 36, 36 to release the extension 35 of the pendulating lever 18 so that the same will be swung upwardly to such an elevated position as will correspond with the weight of the article placed upon the pan or support, and will come to rest with its extension 35 at an appropriate elevation within the casing portion 3, as for example, such as is shown in Fig. 3 of the drawings.

The weighing operation being then completed, and handle 56 being grasped by the operator, the yoke or lever 39 is swung pivotally upward from its inactive lowered position in order to actuate the registering mechanism carried by said yoke or lever and to register the weight of the article rested upon the pan or support 8, the first upward movement of said yoke or lever 39 operating to withdraw the tapered wedging member 42$^a$ from its engagement between the outwardly directed end portions 42, 42 of the detent members 36, 36, whereupon the spring 41 is permitted to automatically press said clamping or detent members 36 into effective engagement with the extension 35 of the pendulating lever 18, whereby the same will be securely retained in the elevated position to which it shall have been moved during the preceding weighing operation, so that as the yoke or member 39 is further elevated, the extension 35 will afford a fixed abutment whereon the contact member 38 of the yoke or lever 39 is adapted for engagement to stop the upward swinging or pivotal movement of said yoke or member at an elevation corresponding with the weight of the article rested upon the pan or support 8.

45 represents a segment rack carried upon the casing portion 3 and extended concentrically with relation to the point of pivotal connection of the yoke or lever 39 therewith, and adapted to be traversed by said yoke or lever when the same is swung pivotally as above described, and 46 represents a gear pinion, carried upon one end of a shaft 47 journaled transversely in the yoke or lever 39, and meshing with the gear surface of said segment rack 45 in such a manner as to communicate the movement of the yoke or lever 39, when swung pivotally as above described, to said shaft 47.

48 represents a flexible band or metal strip, one end of which is secured to shaft 47 and adapted to be wound thereon during the rotatory movement of the shaft in unison with said lever member 39, and 49 represents a spring with which said band 48 has connection in such a way that the tension of said spring is exerted to retract said shaft 47 and the registering devices connected therewith when the lever or member 39 is returned to its lowered inactive position, and to prevent looseness or chattering of the gear connection at the segment rack 45. The operation of this spring 49 and strip 48 is similar to that of the casing 26 and its shiftable weight 28 above described, and said casing and weight may be substituted therefor if desired.

The registering mechanism carried upon the lever or member 39 comprises a series of disks 50, 50, fitted side by side upon the shaft 47, and having projecting pins 51, 51 upon their perimetral surfaces, such pins 51, 51 being produced in a spiral arrangement upon the perimeter of the drum or cylinder formed by the related disks 50, 50, and a carriage or holder 52 pivotally mounted upon the outer part of the frame or member 39 adjacent to the handle 56 thereof and extended opposite to the perimeter of the registering drum or cylinder, and curved concentrically therewith.

The carriage or holder 52 has its opposite sides grooved as shown at 53, 53 to receive the opposite edges of a card or record slip 54 such, for example, as that illustrated in detail in Fig. 6. This card or record slip has a printed formula produced thereon as clearly shown in the drawing, this formula having spaces marked with spaces or graduations to represent different prices and weights which, when the card or slip is inserted in the carriage or holder 52, are adapted to stand in proper relation to the pins 51, 51 of the registering mechanism, so that when the said carriage or holder 52 is swung pivotally toward the perimeter of the registering drum, the pins or projections 51, 51 thereof will perforate the card or slip 54 at such points, as shown at 54ª in Fig. 6, as will indicate the correct weight and selling price of the article rested upon the pan or support 8.

For actuating the pivotally supported carriage or holder 52 in moving it toward the perimeter of the registering drum, I provide the same with a handle 57 extended adjacent to the handle 56 of the actuating member or lever 39, so as to be in position to be conveniently grasped by the hand of the operator after said lever or member 39 shall have been swung pivotally upward by means of its said handle 56 in actuating and setting the registering mechanism to register the weight and price of the article rested upon the pan or support 8. 55 represents a retracting spring connected with the carriage or holder 52 and serving to maintain the same normally out of contact with the perimeter of the registering drum.

In practice, the cards or slips 54 will be printed with price graduations calculated at different prices per pound, and if the article to be weighed is priced at say ten cents per pound a card whereon the price graduations are calculated at the rate of ten cents per pound will be inserted in the holder or carriage 52 prior to the upward swinging movement of the yoke or member 39 and the movement of the carriage or holder toward the perimeter of the registering drum. In Fig. 6 the card or slip 54 is shown with its price graduations calculated at the rate of eight cents per pound.

In Figs. 7, 8 and 9 I have shown a modified formation of the registering mechanism wherein the extension 35 instead of being produced upon the pendulating lever 18 is produced upon an auxiliary lever 60 pivotally mounted in the casing portion 3 and partaking of the movement of said lever 18 during the weighing operation. This auxiliary lever 60 has a segmental part 35ª extended from it and curved concentrically with its pivot point and adapted to be engaged between clamping or detent members 36ª 36ª pivoted in the casing portion 3 and each actuated by a spring which serves to hold the members in clamping engagement with said segmental extension 35ª. Otherwise the structure is similar to that above described.

In Figs. 10 to 14 inclusive I have shown a modified formation of the improved registering mechanism having electrical actuating and controlling means. In the structure herein shown, the registering drum 50ª is not carried by a swinging member or yoke as in the preceding structure, but is held upon the shaft 47 journaled in the casing portion 3 and driven from a segment rack 45ª carried by the swinging lever or member 63 which replaces the lever or member 39 in the preceding construction and serves to set the registering devices to correspond with the movement of the pendulating lever in weighing, being adapted, for this purpose, to engage the extension 35 carried by the lever 60 which is actuated from said pendulating lever during the weighing operation.

The registering drum 50ª is formed upon its perimetral surface with a spiral series of printing surfaces 69, alongside which is arranged a corresponding spiral series of V-shaped centering teeth 71, as shown in the detail view, Fig. 12.

70 represents an ink roller adapted to ink the printing surfaces of the registering mechanism during the rotatory movement thereof.

78 represents a paper strip or web which is fed from a reel or drum 80 down through the casing portion 3 by means of feeding rollers 79 and is guided over the perimeter of the registering drum in position to receive the impression of the printing surfaces 69 when the registering mechanism is actuated.

73 represents a hammer carried upon a lever 74 pivoted upon a frame or carriage 82 movable transversely of the casing portion 3, said hammer 73 being positioned to engage behind the paper strip or web 78 to press the same upon the printing surfaces 69 of the registering drum when the lever 74 is moved pivotally, and being capable of movement transversely across the perimeter of the drum in unison with the transverse movement of the frame or carriage 82 so as to be always positioned in line with said printing surfaces 69 of the drum despite the spiral arrangement of said printing surfaces. The hammer 73 has an extension 72 the end of which is beveled so as to be adapted, when the lever 74 is moved pivotally, to engage one of the V-shaped notches or teeth 71 of the registering drum so as to position the hammer centrally for contact with the adjacent printing surface and thereby insure perfect impression of said printing surface upon the paper strip or web 78.

The frame or carriage 82 is guided for movement across the casing portion 3 upon transverse shafts 83 and 84, the shaft 84 being screw threaded as shown in Fig. 11, and having screw engagement with said frame or carriage in such a manner as to move the same transversely of the casing portion when said screw threaded shaft is rotated.

85 represents a gear connection for driving the shaft 85 in unison with the shaft 47.

75 represents a retracting spring connected with the frame or carriage 82 and serving to hold the lever 74 in such a position that the hammer 73 and its extension 72 are withdrawn from the perimeter of the registering drum. The reel 80 and the feed rollers 79 are also carried upon the frame or carriage 82.

The lever 74 is connected with the core 76 of a solenoid 77 by means of which it is actuated when the solenoid is energized to throw the hammer 73 toward the perimeter of the registering drum, and said core 76 also has connection with a ratchet feed device 81 by means of which the paper strip or web 78 is fed through the device in unison with the energization of said solenoid.

The actuating lever or member 63 has a segmental extension 67 which forms the core of a solenoid 68 mounted within the casing portion 3, and said lever or member 63 is also provided with a spring contact 62 adapted, when the said lever or member is moved upwardly from its lowered inactive position, to come into electrical communication with a contact piece 61 carried upon the lever 60 which is actuated from the pendulating lever. The clamping or detent members 36 are normally separated by a spring 64, and are reversely moved into clamping engagement with the extension 35 by means of a solenoid 66, the core 65 of which has connection with one of said clamping or detent members, as clearly shown in Fig. 13.

94 represents a source of electrical supply, which may be a battery or other generator, from one terminal of which is extended a conductor 93 leading to one terminal of the winding of the solenoid 66, the opposite terminal whereof has connection by way of a conductor 93ª with one terminal of the winding of the solenoid 68 which controls the movement of the actuating lever or member 63.

99 represents a conductor extended from the opposite terminal of the winding of solenoid 68 to a switch lever 96 arranged within a casing which may be positioned adjacent to a railway track, in case the improved registering mechanism be employed, as herein illustrated, in connection with a railway track scale, said switch lever 96 being normally retracted by a spring 98 out of electrical contact with a contact piece or member 100 which is connected by a conductor 95 with the opposite terminal of the generator 94.

110 represents a projection carried upon the car to be weighed, and which may, if desired, be one of the standard parts thereof. This projection 110 is adapted for contact with the extremity of the switch lever 96 as the car moves along the track during or immediately after the completion of the weighing operation in such a way as to swing said lever 96 against the tension of its spring 98 to the position shown in Fig. 14, whereupon said lever is engaged and held against the retracting influence of said spring 98 by means of a detent 97 actuated by a spring 101, and carrying the core 102 of a solenoid 103, which is capable of being energized as will be hereinafter explained in order to depress the detent 97 against the tension of its spring 101 so as to permit the retracting spring 98 to return the switch lever 96 to its normal position out of communication with the contact member 100.

The solenoid 103 has one terminal of its winding connected with the conductor 95 leading from the generator by means of a conductor 104 and its opposite terminal connected by a conductor 106 leading to the lever 60 which as before mentioned has electrical communication at 61 with the spring contact 62 of the actuating member or lever 63. From said spring contact 62 is extended a circuit conductor 109 leading to one terminal of the winding of the solenoid 130

77 which actuates the printing mechanism, the opposite terminal of said winding of solenoid 77 being connected by a conductor 92 with the terminal connection 93 at the opposite side of the generator, as shown at 92 in Fig. 14. By this arrangement it will be seen that a car, indicated at *x* upon the drawings, upon being positioned upon the scales for weighing, will present its projection 110 adjacent to the extremity of the switch lever 96 so that when the car is moved along the track in the direction of the arrow in Fig. 14 after the completion of the weighing operation, said projection 110 will contact with the switch lever 96 and will throw the same pivotally to the position shown in said figure, whereby the circuit wherein the solenoids 66 and 68 are included will be completed, and said solenoids will be energized.

Upon the energization of the solenoid 66, the clamping or detent members 36, 36 will be thrown against the tension of the spring 64 into clamping engagement with the extension 35 of the auxiliary lever 60 so as to effectively hold said lever in the elevated position to which it shall have been moved by the operation of the weighing mechanism during the weighing of the car while the said weighing mechanism is thereafter free to resume its normal inactive position.

Since the solenoid 68 is energized simultaneously with the energization of the solenoid 66, said solenoid 68 will serve to attract its core 67 and thereby compel pivotal or swinging movement of the actuating lever or member 63 with which said core has connection, so that the rack 45ª is caused to rotate the registering drum and set the printing surface thereof opposite to the hammer 73 to correspond with the position wherein the auxiliary lever 60 shall have been moved during the weighing operation.

So soon as the actuating lever or member 63 shall have been sufficiently moved upward by the operation of the solenoid 68, its spring contact 62 will come into electrical communication with the contact piece 61 upon the auxiliary lever 60, so that at the time the upward swinging movement of the actuating member or lever 63 is terminated by engagement with said auxiliary lever 60, the circuit will be completed between the contacts 61 and 62 and current will be permitted to flow through the windings of solenoids 77 and 103 to energize the same.

Upon the energization of the solenoid 77, the core 76 thereof is attracted so as to swing the lever 74 pivotally and cause the hammer 73 to force the paper strip or web 78 into printing contact with the printing surface 69 of the registering drum so that the weight of the car is printed upon said strip or web, and by the time this shall have been effected, the solenoid 103 which is energized simultaneously with the solenoid 77, will have retracted the detent 97 so as to release the switch lever 96 therefrom, and permit the retracting spring 98 to withdraw the same from communication with the contact member 100 whereby the circuit from the generator 94 to the solenoids 66 and 68 is interrupted and said solenoids are again deënergized to permit the spring 64 to withdraw the members 36 from clamping engagement with the auxiliary lever 60 and to permit the actuating lever or member 63 to fall by gravity to its normal inactive lowered position, and to return the registering mechanism to a corresponding position.

As the actuating member or lever 63 resumes its lowered inactive position, the spring contact 62 is withdrawn from electrical communication with the contact 61 of the auxiliary lever 60 whereby the circuit from the generator 94 to the solenoids 77 and 103 is interrupted and said solenoids are deënergized, so that the spring 75 is permitted to reversely move the lever 74 and actuate the feeding mechanism 81 to feed the tape or web into renewed printing position, while the spring 101 is permitted to elevate the detent 97 into position for operative engagement with the switch lever 96 upon the passage of the next car to be weighed.

In Figs. 15, 16 and 17 I have shown still another modified formation of the improved registering mechanism together with a modified form of record slip or card to be used in connection therewith. In this construction of the registering mechanism, 63ª represents the actuating member or lever which is provided with an attached segment rack 45ª the teeth of which are in mesh with a gear pinion 46ª upon a screw shaft 47ª journaled in collared bearings and adapted, when turned, to be traversed in the direction of its length by a slide or carriage 119 which carries a pencil 120 pressed by a spring 121 into writing contact with the record slip or card 54ª carried by the holder 52ª which is similar to the holder 52 shown in Figs. 1 to 5, but is carried upon a supporting lever or member 115 which is mounted for pivotal movement in such a manner that the card or slip inserted within the holder 52ª may be moved vertically with relation to the pencil 120, while said pencil is at the same time capable of movement transversely across the card or slip during the rotatory movement imparted to the shaft 47ª by the gear pinion 46ª and rack 45ª.

The supporting member or lever 115 whereon the holder 52ª is carried has a notched segment 116 pendent from it concentric with the segment rack 45ª, and the extended end 35 of the auxiliary lever 60 actuated from the weighing mechanism as in the preceding structure is adapted to traverse this notched pendent segment and to be locked fast in relation thereto by appropriate locking or detent means such as I have described above.

117 represents a dog or latch pivoted upon the actuating lever or member 63ª and adapted, when said member or lever is swung upwardly from its lowered inoperative position after the completion of the weighing operation, to come into contact with the extended end 35 of the auxiliary lever 60 whereby said dog or latch is swung pivotally in such a manner as to engage a projection 118 thereon with the adjacent notch of the notched pendent segment 116 of the supporting lever or member 115 whereon the card or slip holder 52ª is carried. By this arrangement of the parts, when the weighing operation is completed, the actuating member or lever 63ª is swung pivotally upward, its rack 45ª serving to drive the screw shaft 47ª so that the pencil 120 is caused to traverse the card or slip 54ª in a transverse or horizontal direction as indicated at $a$ on Fig. 17, the dog or latch 117 simultaneously traversing the segment 116 of the supporting member 115 until it comes into contact upon the extension 35 of the auxiliary lever 60, whereupon said dog or latch is swung pivotally to cause its projection 118 to engage with the adjacent notch of the segment 116 after which said segment is locked to the actuating member or lever 63ª, and the supporting member is thereafter compelled to partake of the upward movement of the actuating member.

The spacing of the notches of the segment 116 is such as will conform to the different positions assumed by the auxiliary lever 60 in weighing articles varying in weight by pounds, and the construction and arrangement is such that the supporting member 115 is now actuated to move the card or slip 54ª vertically when the article weighed equals one or more pounds, but is only actuated as above described when such article is less than or exceeds one or more pounds in weight, whereby it will be seen that if the article placed upon the pan or support 8 weighs exactly one pound, or any number of pounds exactly, the pencil 120 will be moved transversely across the same as indicated at $a$ in Fig. 17 to accurately indicate such number of pounds. But should the weight of the article being weighed exceed or be less than one or more pounds in weight, the supporting member 115 will be actuated to elevate the card or slip to an extent commensurate with the number of ounces included in the weight of such article, whereby the pencil 120 will be caused to traverse an inclined path as indicated at $b$ on Fig. 17 so as to accurately register the number of ounces less than one pound or in excess of one or more pounds which is comprised in the weight of the article.

From the above description of my improvements it will be seen that the indicating and registering mechanism constructed according to my invention is of an extremely simple and comparatively inexpensive nature and is particularly well adapted for use by reason of the convenience and accuracy of its operation and of the fact that the actuation of such mechanisms is accomplished without placing any undue or extraordinary stress upon the operative parts of the instrument in connection wherewith they are used, so that the accuracy of such instrument is not interfered with, and it will also be obvious from the above description that the invention is susceptible of some modification without material departure from its principles and spirit and for this reason I do not desire to be understood as limiting myself to the precise formation and arrangement of the several parts of the device herein set forth in carrying out my invention in practice.

Having thus described my invention, what I claim and desire to secure by Letters Patent is—

1. In index mechanism, two index members one of which is mounted for turning movement relatively to the other and has a track produced upon it eccentric to its axis of movement, and a counterbalancing device having shifting engagement with said eccentric track of the movable index member and capable of operation to retard vibratory or oscillatory movement thereof.

2. In index mechanism, two index members one of which is mounted for turning movement relatively to the other, a casing connected with the movable index member and having a chamber eccentric to the center of rotation of said movable index member, and a shiftable weight contained in said eccentric chamber and capable of operation to retard vibratory or oscillatory movement of the movable index member.

3. In index mechanism, two index members one of which is mounted for turning movement relatively to the other, a casing connected with said movable index member and having a volute passage produced within it, and a weight contained in said passage and movable along the same and adapted for operation to check vibratory or oscillatory movement of said movable index member.

4. In index mechanism, two index members one of which is mounted for turning movement relatively to the other, a casing connected with said movable index member and having a curved passage produced within it, said passage having a curvature of uniform eccentricity with respect to the axis of rotation of the movable index member throughout its entire length, and a weight contained in and movable along said passage and capable of operation to check vibratory or oscillatory movement of the movable index member.

5. The combination of registering mechanism, controlling means therefor, a measuring instrument in actuating relation to said controlling means, and actuating mechanism also in actuating relation to said controlling means and capable of operation first to adjust the registering mechanism into registering condition, and afterward to reset the same to zero.

6. The combination of registering mechanism, a measuring instrument, a member controlled by the operation of the measuring instrument, for operating the registering mechanism, and actuating mechanism for the registering mechanism in controlling relation to said member.

7. The combination of an adjustable controlling member, a measuring instrument operable to control the adjustment of said member, a registering mechanism controlled by said member, and means controlled by said registering mechanism and operable to hold said member in adjusted position.

8. The combination of an adjustable controlling member, a measuring instrument operable to control the adjustment of said member, a registering mechanism whose operation is controlled by said member, releasable means operable during the operation of the registering mechanism to hold said member in adjusted position, and other means operable first to reset the registering mechanism and afterward to release said member from said holding means.

9. The combination of registering mechanism, a measuring instrument capable of operation independently of the registering mechanism, means for controlling the operation of the registering mechanism from said measuring instrument, mechanism actuated upon operation of the registering mechanism capable of operation first to adjust the same into registering condition, and afterward to reset the same, and recording means adapted to coöperate with the registering mechanism when adjusted into registering condition.

10. The combination of registering mechanism, a measuring instrument capable of operation independently of the registering mechanism, means for controlling the operation of the registering mechanism from said measuring instrument, mechanism actuated upon operation of the registering mechanism capable of operation first to adjust the same into registering condition, and afterward to reset the same, and manually controlled recording means adapted to coöperate with the registering mechanism when the same is adjusted into registering condition.

11. The combination of a measuring instrument, reversely movable registering mechanism operable independently of said measuring instrument and capable of adjustment into registering position when moved in one direction and adapted to be reset when reversely moved, and means actuated by the measuring instrument and in controlling relation to the registering mechanism and controlled from said registering mechanism.

In witness whereof I have hereunto signed my name in the presence of two subscribing witnesses.

WILHELM SIMONSSON.

Witnesses:
J. L. CAPLINGER,
A. F. CONNETT.